May 14, 1968   J. A. FORD   3,382,702
FRICTION TESTING APPARATUS

Filed Dec. 13, 1965   2 Sheets-Sheet 1

INVENTOR.
JAMES A. FORD

BY Edwin D. Grant

ATTORNEY

May 14, 1968   J. A. FORD   3,382,702
FRICTION TESTING APPARATUS
Filed Dec. 13, 1965   2 Sheets-Sheet 2

INVENTOR.
JAMES A. FORD

BY Edwin D. Grant

ATTORNEY

United States Patent Office 3,382,702
Patented May 14, 1968

3,382,702
FRICTION TESTING APPARATUS
James A. Ford, Hopkins, Minn., assignor to Thiokol Chemical Corporation, Bristol, Pa., a corporation of Delaware
Filed Dec. 13, 1965, Ser. No. 513,453
4 Claims. (Cl. 73—9)

ABSTRACT OF THE DISCLOSURE

An apparatus for testing the sensitivity of combustible material to friction which includes a pair of horizontal members having surfaces of predetermined roughness arranged on a work table with a sample of combustible material therebetween. A lever system is provided to apply known forces to the sample while simultaneously moving at least one of the surfaces with respect to the other thereby determining the frictional force necessary to ignite the test sample.

---

This invention relates to a testing apparatus and more particularly to an apparatus for testing the sensitivity of combustible materials to friction under controlled conditions.

To ascertain what safety measures must be observed in manufacturing and handling certain materials, such as new solid propellants, it is desirable to determine the sensitivity of the materials to friction. However, although effective test devices have long been available for testing many of the physical properties of combustible materials, there has been a need for an improved apparatus for subjecting such materials to frictional heating under controlled, reproducible conditions. The present invention meets this need by providing means for abrading a sample of combustible materials between surfaces which have a predetermined velocity relative to each other while the sample is being subjected to a predetermined pressure. More particularly, a preferred embodiment of this invention comprises a pair of friction members in the form of relatively thin, metallic strips between the mutually opposed surfaces of which a sample of a combustible material can be positioned, a worktable on which the friction members can be supported after the sample has been placed therebetween, a pressure wheel that can be pressed against the superposed friction members to subject the sample therebetween to different pressures, means for holding one of the friction members in stationary position on said worktable, and means for drawing the other of the friction members under the pressure wheel at a predetermined velocity.

It is accordingly a broad object of this invention to provide an effective apparatus for testing the sensitivity of combustible materials to friction.

Another object of this invention is to provide an apparatus for testing the sensitivity of combustible materials and friction under different pressures.

An additional object of this invention is to provide an apparatus for testing the sensitivity of combustible materials to frictional heating which results from abrading said materials with surfaces of different roughness and hardness.

A further object of this invention is to provide an apparatus for testing the sensitivity of combustible materials to frictional heating which results from abrading said materials with surfaces moving at different velocities.

Other objects and advantages of the present invention will become apparent in the following specification thereof, in which reference is made to the accompanying drawings, wherein.

Throughout the specification and drawings, like reference numbers refer to like parts.

Figure 1:
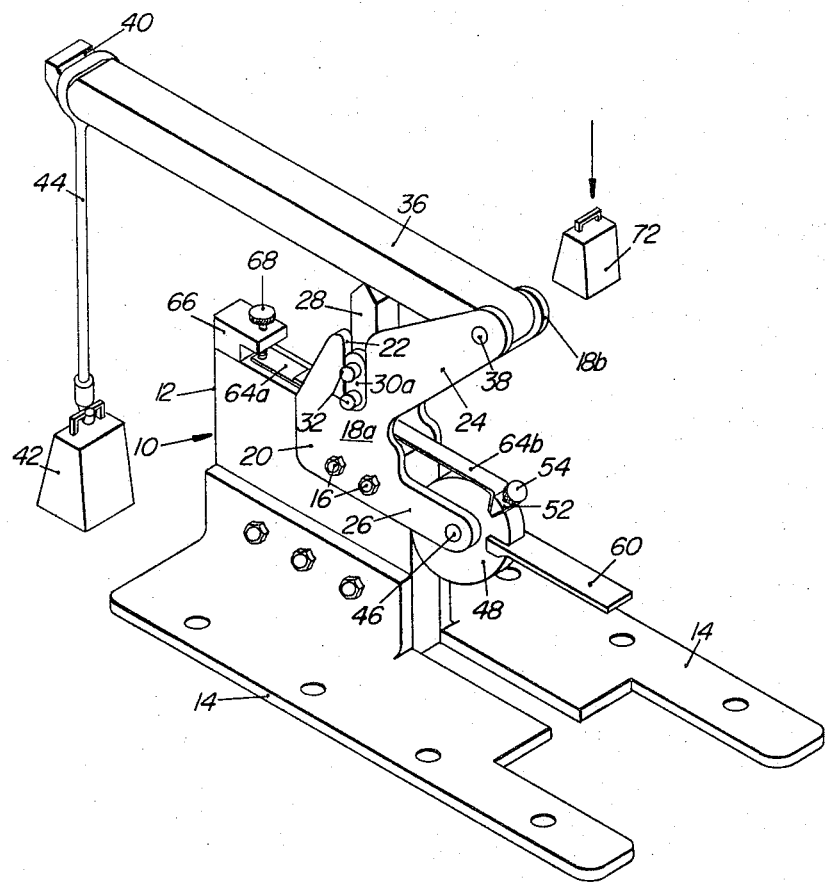
FIGURE 1 is a pictorial view of a preferred embodiment of the invention.
Figure 2:
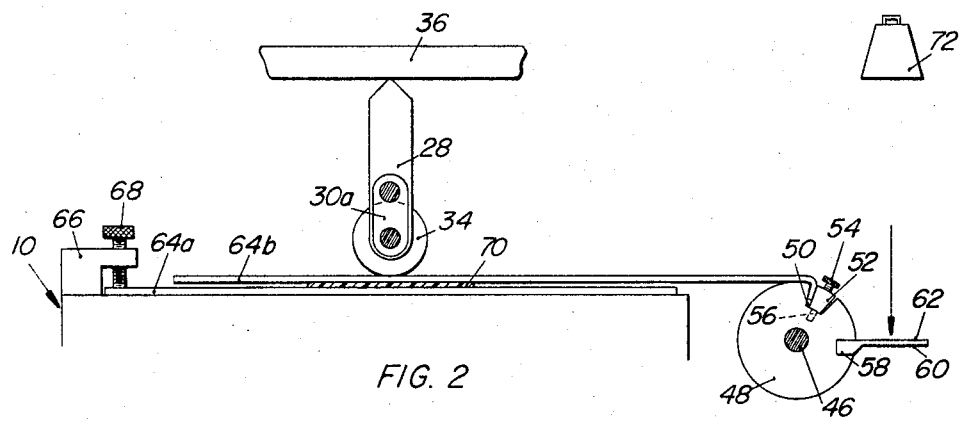
FIGURE 2 is an elevational view of certain components of the preferred embodiment of the invention; and, FIGURE 3 is an elevational view of modifications of certain components of the preferred embodiment of the invention.

In FIG. 1 the reference number 10 generally designates a worktable comprising an elongated block 12 which is disposed between two base members 14 and fixedly joined thereto. Attached to opposite sides of worktable 10 by means of a plurality of screws 16 are two support brackets, generally designated by reference numbers 18a, 18b, each of which comprises a first portion 20 which projects above said worktable and which has a vertically extending slot 22 formed therein, a second integral, elongated portion 24 which extends obliquely upward from the upper end of said first portion, and a third integral, elongated portion 26 which extends horizontally from the lower end of said first portion and which projects from one end of said worktable. A support member 28 is slidably positioned between support brackets 18a, 18b, i.e., a portion of one side of said support member slidably abuts support bracket 18a, and a portion of the opposite side of said support member slidably abuts support bracket 18b. Support member 28 is maintained substantially perpendicular to worktable 10 (or more particularly, to its upper work support surface) by means of two elongated guide members 30a, 30b (only one of which can be seen in the drawings) which project from opposite sides of said support member and which are respectively slidably engaged in the slots 22 in support brackets 18a, 18b. In the preferred embodiment of the invention herein described guide members 30a, 30b are separate components and are respectively fixedly joined to support member 28 by means of two screws 32. However, the guide members can obviously also be made integral with support member 28. As illustrated in FIG. 2, a pressure wheel 34 is rotatably mounted on the lower end of support member 28, and the upper end of said support member is pointed. One end of a lever 36 is disposed between the free ends (i.e., the ends remote from portion 20) of the second portions 24 of support brackets 18a, 18b and pivotally connected thereto by means of a pin 38. Thus lever 36 can be rotated about pin 38 so that it contacts the upper end of support member 28. The free end of lever 36 is provided with notch 40 to facilitate attachment of a weight 42 to said lever by means of a cord 44.

Disposed between the free ends of the third portions 26 of support brackets 18a, 18b and rotatably connected thereto by means of a pin 46 is a wheel 48. As can best be seen in FIG. 2, wheel 48 is provided with a groove 50 that extends inwardly from the periphery of said wheel and which is shaped to matingly receive a locking wedge 52. A screw 54 extends through a hole in locking wedge 52 and is threadedly engaged within a hole 56 (illustrated by broken lines in FIG. 2) that extends from the bottom surface of groove 50. Wheel 48 is also provided with a second groove 58 in which an arm 60 is fixedly engaged, as by means of a forced fit, said groove 58 being formed in said wheel so that surface 62 of said arm extends radially from the periphery of wheel 48.

The disclosed testing apparatus also comprises first and second friction members 64a, 64b which, as mentioned hereinbefore, are relatively thin, flexible, metallic strips each having a planar surface of predetermined roughness. That is, at least one planar surface of each friction member 64a, 64b is provided with a finish that can advantageously be used to test the sensitivity of a particular combustible material to friction, which finish can vary considerably so that the term "predetermined roughness"

is to be considered as including both smooth and rough surfaces within its scope. As illustrated in both FIGS. 1 and 2, one leg of an L-shaped member 66 is fixedly mounted on the upper surface of worktable 10, as by means of being welded thereto, with the other leg of said member extending toward support brackets 18a, 18b. A locking screw 68 is threadedly engaged in a hole formed in the horizontally extending leg of member 66, this screw being disposed perpendicular to the upper surface of worktable 10.

A sample 70 of combustible material that is to be tested by means of the described apparatus is placed between friction members 64a, 64b to form a layered test assembly which can be placed under pressure wheel as illustrated in FIG. 2. More specifically, friction member 64a is clamped in stationary position on worktable 10 by means of screw 68 with the surface of predetermined roughness of said friction member facing upward; the sample 70 of material to be tested is placed upon friction member 64a; and friction member 64b is placed upon sample 70 with the surface of predetermined roughness of said friction member facing downward. Pressure wheel 34 is then pressed against the test assembly by bringing lever 36 down upon the upper end of support member 28 and attaching a selected weight 42 to said lever. After one of its ends has been secured to wheel 48 by means of locking wedge 52 and locking screw 54, the friction member 64b can be moved relative to pressure wheel 34 by dropping a selected weight 72 onto arm 60, or by striking said arm with some other suitable object such as the arm of a standard impact tester.

Although the described apparatus is obviously not limited to with respect to the kind of combustible material that can be tested thereby, it has advantageously been used to test the sensitivity of new solid propellants to friction. In such tests, a plurality of samples 70 of the solid propellant to be tested are prepared in uniform size and thickness, these samples being respectively placed between friction members 64a, 64b which are identical in size, thickness and surface roughness. The same weight 72 is utilized for a test series in which the weight 42 is incrementally varied until 50% of the samples tested are ignited when said weight 72 is dropped onto arm 60. The weight 42 that produces this "50% fire point" is related to that necessary to produce a 50% fire point in a reference solid propellant, so that an index number designating friction sensitivity can be assigned to the new material.

Figure 3:
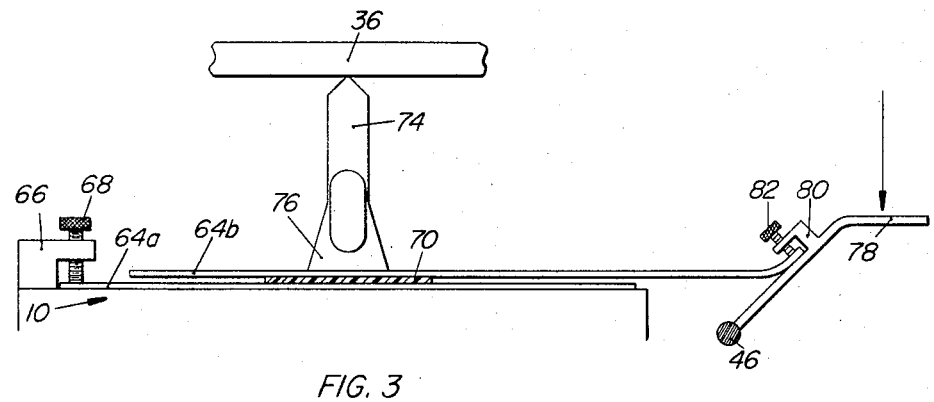

It should be understood from the foregoing discussion that the invention makes it possible to test the sensitivity of combustible materials to friction under controlled reproducible conditions, a result which has not previously been possible with known test apparatus. More specifically, the preferred embodiment of the invention provides means by which the sensitivity of combustible materials to friction can be determined under different conditions. Thus the sensitivity of combustible materials to friction under different pressures can be determined by varying the weight 42; the sensitivity of such materials to friction caused by abrading them with surfaces of different hardness and roughness can be determined by use of suitable friction members 64a, 64b formed of different materials; and the sensitivity of such materials to friction caused by abrading them with surfaces moving at different velocities can be determined by varying the rotational velocity of wheel 48, as by dropping weight 72 onto arm 60 from different elevations. Furthermore, the described embodiment of the invention is simple in design and thus can be manufactured at relatively low cost, and its construction makes it a practical test apparatus, since the friction members 64a, 64b, which are the components of the test apparatus that are subjected to the greatest wear, are readily replaceable and all other components are of durable construction. It will also be recognized that various modifications can be made in the components of the disclosed test apparatus without departing from the principles of the invention. For example, as illustrated in FIG. 3, support member 28 and pressure wheel 34 of the preferred embodiment of the invention can be replaced with a support member 74 having a relatively large base 76 that distributes the force applied to the test assembly comprising friction members 64a, 64b and sample 70 over a larger area of said friction member 64b, and wheel 48 and the components mounted thereon can be replaced with an arm 78 one end of which is fixedly joined to pin 46 and which includes an integral L-shaped member 80 and a locking screw 82 threadedly engaged with said member 80 for securing one of the friction members 64a, 64b thereto. Other means can also be employed to move friction member 64b relative to pressure wheel 48 (or to base 76 of the modified support member), and if desired, friction member 64a can simultaneously be moved in a direction opposite to that in which friction member 64b is moved instead of being held in stationary positions on worktable 10. Friction members 64a, 64b can obviously be made of many different materials having different hardness and do not have to be made of metal. Therefore, the scope of the invention is to be considered as limited only by the terms of the appended claims.

What is claimed is:

1. Apparatus for testing the sensitivity of a combustible material to friction, comprising:

a pair of friction members capable of receiving a sample of said combustible material therebetween to form a layered test assembly, each of said friction members having at least one planar surface of predetermined roughness for placement against said sample;

pressure means comprising, a weighted lever for producing a downwardly directed force, and a vertical support member, said member contacting said lever at its upper end and movably contacting said test assembly at its lower end for applying a predetermined pressure to said sample in said test assembly; and, means for moving at least one of said friction members relative to said pressure means.

2. Apparatus for testing the sensitivity of a combustible material to friction comprising:

a worktable;

first and second friction members capable of receiving a sample of said combustible material therebetween to form a layered test assembly, each of said friction members having at least one planar surface of predetermined roughness for placement against said sample, said second friction member being flexible;

means for holding said first friction member in stationary position on said worktable;

a pair of support brackets fixedly mounted on said worktable in spaced, parallel relation with each other, each of said support brackets comprising a first portion which projects above said worktable and which has a vertically extending slot formed therein, a second integral, elongated portion which extends obliquely upward from the upper end of said first portion, and a third integral portion which extends horizontally from the lower end of said first portion and which projects from one end of said worktable;

pressure means comprising an elongated support member slidably positioned between said support brackets and disposed substantially perpendicular to said worktable, said support member having elongated guide members which are fixedly joined thereto, project from the sides thereof, and are respectively slidably engaged in said slots in said support brackets, a pressure wheel rotatably mounted on the lower end end of said support member, and a lever one end of which is disposed between the free ends of said second portions of said support brackets and pivotally connected thereto so that said lever can be engaged with the upper end of said support member, the other end of said lever being adapted to support a weight, said slots in said support brackets and said support member being respectively of such lengths that said pressure wheel can contact said test assembly when the latter is supported on said worktable; and, means for moving said second friction member relative to said pressure wheel, said means comprising a wheel disposed between the free ends of said third portions of said support brackets and rotatably connected thereto, fastening means adapted to detachably connect one end of said second friction member to said wheel, and a bar fixedly mounted on said wheel so as to project radially therefrom.

3. The invention of claim 1 wherein the vertical support member end contacting said test assembly comprises a pressure wheel.

4. The invention of claim 1 wherein the said vertical support member end contacting said test assembly comprises a widened base portion for enlarging the area of contact on said test assembly.

References Cited

UNITED STATES PATENTS

| | | | |
|---|---|---|---|
| 1,902,594 | 3/1933 | Thomas | 73—9 |
| 3,194,064 | 7/1965 | Miles | 73—101 |

DAVID SCHONBERG, *Primary Examiner.*